US006995743B2

(12) United States Patent
Boer et al.

(10) Patent No.: US 6,995,743 B2
(45) Date of Patent: Feb. 7, 2006

(54) LIGHT SENSITIVE DISPLAY

(75) Inventors: Willem den Boer, Hillsboro, OR (US); Adiel Abileah, Portland, OR (US)

(73) Assignee: Planar Systems, Inc., Beaverton, OR (US)

(*) Notice: Subject to any disclaimer, the term of this patent is extended or adjusted under 35 U.S.C. 154(b) by 317 days.

(21) Appl. No.: 10/307,106

(22) Filed: Nov. 27, 2002

(65) Prior Publication Data

US 2003/0156087 A1 Aug. 21, 2003

Related U.S. Application Data

(60) Provisional application No. 60/359,263, filed on Feb. 20, 2002.

(51) Int. Cl.
G09G 3/36 (2006.01)
(52) U.S. Cl. ................ 345/104; 345/87; 178/18.11
(58) Field of Classification Search ............. 345/87, 345/90–93, 103, 104, 173; 178/18.1, 18.11
See application file for complete search history.

(56) References Cited

U.S. PATENT DOCUMENTS 4,220,815 A 9/1980 Gibson et al.
(Continued)

FOREIGN PATENT DOCUMENTS

DE 3602796 A1 8/1987
(Continued)

OTHER PUBLICATIONS

Yamaguchi et al., "Two-dimensional Contact-Type Image Sensor Using Amorphous Silicon Photo-Transistor," Jpn. J. Appl. Phys., vol. 32, pp. 458-461, Jan. 1993.

(Continued)

Primary Examiner—Kent Chang
(74) Attorney, Agent, or Firm—Chernoff, Vilhauer, McClung & Stenzel

(57) ABSTRACT

A liquid crystal device includes a front electrode layer, a rear electrode layer, and a liquid crystal material located between the front electrode layer and the rear electrode layer. A first and second transistor each includes three terminals. The first transistor is a photo transistor. The first terminal of the first transistor electrically interconnected to a conductive electrode free from additional electrical elements therebetween. The second terminal of the first transistor is electrically interconnected to the conductive electrode free from additional electrical elements therebetween and the second terminal of the first transistor is maintained at the same potential as the conductive electrode. The first terminal of the first transistor and the second terminal of the first transistor electrically interconnected to one another free from additional electrical elements therebetween and the first terminal of the first transistor and the second terminal of the first transistor are maintained at the same potential. The second terminal of the first transistor is a gate of the first transistor. The third terminal of the first transistor electrically interconnected to the first terminal of the second transistor free from additional electrical elements therebetween and maintained at the same potential. The second transistor provides a readout function for the circuit. The second terminal of the second transistor electrically connected to one of the select electrodes. The second terminal of the second transistor is a gate of the second transistor. The third terminal of the second transistor is electrically interconnected to a readout system. The second transistor is substantially inhibited from receiving ambient light thereon. The first transistor is not substantially inhibited from receiving ambient light thereon. The first transistor and the second transistor being together with the rear electrode layer. The readout system determines a region of the device that experiences a change in the light level impinging on the device.

17 Claims, 11 Drawing Sheets

U.S. PATENT DOCUMENTS

| | | | |
|---|---|---|---|
| 4,320,292 A | 3/1982 | Oikawa et al. | |
| 4,345,248 A | 8/1982 | Togashi et al. | |
| 4,476,463 A | 10/1984 | Ng et al. | |
| 4,481,510 A | 11/1984 | Hareng et al. | |
| 4,496,981 A | 1/1985 | Ota | |
| 4,603,356 A | 7/1986 | Bates | |
| 4,644,338 A | 2/1987 | Aoki et al. | |
| 4,655,552 A | 4/1987 | Togashi et al. | |
| 4,662,718 A | 5/1987 | Masubuchi | |
| 4,679,909 A | 7/1987 | Hamada et al. | |
| 4,684,939 A | 8/1987 | Streit | |
| 4,698,460 A | 10/1987 | Krein et al. | |
| 4,720,869 A | 1/1988 | Wadia | |
| 4,736,203 A | 4/1988 | Sidlauskas | |
| 4,740,782 A | 4/1988 | Aoki et al. | |
| 4,759,610 A | 7/1988 | Yanagisawa | |
| 4,767,192 A | 8/1988 | Chang et al. | |
| 4,772,101 A | 9/1988 | Liu | |
| 4,782,327 A | 11/1988 | Kley et al. | |
| 4,782,328 A | 11/1988 | Denlinger | |
| 4,785,564 A | 11/1988 | Gurler | |
| 4,794,634 A | 12/1988 | Torihata et al. | |
| 4,814,760 A | 3/1989 | Johnston et al. | |
| 4,917,474 A | 4/1990 | Yamazaki et al. | |
| 5,003,956 A | 4/1991 | Iwamoto et al. | |
| 5,051,570 A | 9/1991 | Tsujikawa et al. | |
| 5,105,186 A | 4/1992 | May | |
| 5,140,153 A | 8/1992 | Heikkinen et al. | |
| 5,151,668 A | 9/1992 | Tanaka et.al | |
| 5,153,420 A | 10/1992 | Hack et al. | |
| 5,172,104 A | 12/1992 | Tanigaki et al. | |
| 5,204,661 A * | 4/1993 | Hack et al. | 345/88 |
| 5,236,850 A | 8/1993 | Zhang | |
| 5,243,332 A | 9/1993 | Jacobson | |
| 5,339,090 A | 8/1994 | Crossland et al. | |
| 5,339,091 A | 8/1994 | Yamazaki et al. | |
| 5,349,174 A | 9/1994 | Van Berkel et al. | |
| 5,381,251 A | 1/1995 | Nonomura et al. | |
| 5,386,543 A | 1/1995 | Bird | |
| 5,414,283 A | 5/1995 | den Boer et al. | |
| 5,445,871 A | 8/1995 | Murase et al. | |
| 5,461,400 A | 10/1995 | Ishii et al. | |
| 5,475,398 A | 12/1995 | Yamazaki et al. | |
| 5,483,263 A | 1/1996 | Bird et al. | |
| 5,485,177 A | 1/1996 | Shannon et al. | |
| 5,525,813 A | 6/1996 | Miyake et al. | |
| 5,532,743 A | 7/1996 | Komobuchi | |
| 5,568,292 A | 10/1996 | Kim | |
| 5,581,378 A | 12/1996 | Kulick et al. | |
| 5,585,817 A | 12/1996 | Itoh et al. | |
| 5,589,961 A | 12/1996 | Shigeta et al. | |
| 5,598,004 A | 1/1997 | Powell et al. | |
| 5,610,629 A * | 3/1997 | Baur | 345/104 |
| 5,635,982 A | 6/1997 | Zhang et al. | |
| 5,637,187 A | 6/1997 | Takasu et al. | |
| 5,652,600 A | 7/1997 | Khormaei et al. | |
| 5,677,744 A | 10/1997 | Yoneda et al. | |
| 5,712,528 A | 1/1998 | Barrow et al. | |
| 5,751,453 A | 5/1998 | Baur | |
| 5,757,522 A | 5/1998 | Kulick et al. | |
| 5,767,623 A | 6/1998 | Friedman et al. | |
| 5,778,108 A | 7/1998 | Coleman, Jr. | |
| 5,793,342 A | 8/1998 | Rhoads | |
| 5,812,109 A | 9/1998 | Kaifu et al. | |
| 5,818,553 A | 10/1998 | Koenck et al. | |
| 5,838,290 A | 11/1998 | Kuijk | |
| 5,838,308 A * | 11/1998 | Knapp et al. | 345/173 |
| 5,852,487 A | 12/1998 | Fujimori et al. | |
| 5,877,735 A | 3/1999 | King et al. | |
| 5,890,799 A | 4/1999 | Yiu et al. | |
| 5,917,464 A | 6/1999 | Stearns | |
| 5,920,360 A | 7/1999 | Coleman, Jr. | |
| 5,930,591 A | 7/1999 | Huang | |
| 5,959,697 A | 9/1999 | Coleman, Jr. | |
| 5,962,856 A | 10/1999 | Zhao et al. | |
| 5,990,980 A | 11/1999 | Golin | |
| 5,990,988 A | 11/1999 | Hanihara et al. | |
| 6,020,590 A | 2/2000 | Aggas et al. | |
| 6,020,945 A | 2/2000 | Sawai et al. | |
| 6,023,307 A | 2/2000 | Park | |
| 6,028,581 A | 2/2000 | Umeya | |
| 6,049,428 A | 4/2000 | Khan et al. | |
| 6,067,062 A | 5/2000 | Takasu et al. | |
| 6,087,599 A | 7/2000 | Knowles | |
| 6,133,906 A | 10/2000 | Geaghan | |
| 6,163,313 A | 12/2000 | Aroyan et al. | |
| 6,177,302 B1 | 1/2001 | Yamazaki et al. | |
| 6,181,394 B1 | 1/2001 | Sanelle et al. | |
| 6,184,863 B1 | 2/2001 | Sibert et al. | |
| 6,236,053 B1 | 5/2001 | Shariv | |
| 6,278,423 B1 | 8/2001 | Wald et al. | |
| 6,278,444 B1 | 8/2001 | Wilson et al. | |
| 6,295,113 B1 | 9/2001 | Yang | |
| 6,327,376 B1 | 12/2001 | Harkins | |
| 6,351,076 B1 | 2/2002 | Yoshida et al. | |
| 6,380,995 B1 | 4/2002 | Kim | |
| 6,392,254 B1 | 5/2002 | Liu et al. | |
| 6,399,166 B1 | 6/2002 | Khan et al. | |
| 6,465,824 B1 | 10/2002 | Kwasnick et al. | |
| 6,603,867 B1 | 8/2003 | Sugino | |
| 6,681,034 B1 | 1/2004 | Russo | |
| 6,831,710 B2 | 12/2004 | den Boer | |
| 2001/0000676 A1 * | 5/2001 | Zhang et al. | 349/12 |
| 2001/0046013 A1 | 11/2001 | Noritake et al. | |
| 2001/0052597 A1 | 12/2001 | Young et al. | |
| 2001/0055008 A1 | 12/2001 | Young et al. | |
| 2002/0027164 A1 | 3/2002 | Mault et al. | |
| 2002/0030581 A1 | 3/2002 | Janiak et al. | |
| 2002/0030768 A1 | 3/2002 | Wu | |
| 2002/0052192 A1 | 5/2002 | Yamazaki et al. | |
| 2002/0071074 A1 | 6/2002 | Noritake et al. | |
| 2002/0074549 A1 | 6/2002 | Park et al. | |
| 2002/0126240 A1 | 9/2002 | Seiki et al. | |
| 2003/0103030 A1 | 6/2003 | Wu | |
| 2003/0137494 A1 | 7/2003 | Tulbert | |
| 2003/0156087 A1 | 8/2003 | den Boer et al. | |
| 2003/0156230 A1 | 8/2003 | den Boer et al. | |
| 2003/0179323 A1 | 9/2003 | Abileah et al. | |
| 2003/0205662 A1 | 11/2003 | den Boer | |
| 2003/0218116 A1 | 11/2003 | den Boer | |
| 2004/0046900 A1 | 3/2004 | den Boer et al. | |

FOREIGN PATENT DOCUMENTS

| | | |
|---|---|---|
| DE | 19720925 A1 | 12/1997 |
| EP | 0426362 A2 | 5/1991 |
| EP | 0426362 A3 | 5/1991 |
| EP | 0426469 A2 | 5/1991 |
| EP | 0426469 A3 | 5/1991 |
| EP | 0464908 B1 | 1/1992 |
| EP | 0 490 683 B1 | 6/1992 |
| EP | 0488455 B1 | 6/1992 |
| EP | 0 491 436 B1 | 9/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 633 542 B1 | 1/1995 |
| EP | 0 770 971 A2 | 10/1995 |
| EP | 0 770 971 A3 | 10/1995 |
| EP | 0366913 B1 | 11/1995 |
| EP | 0384509 B1 | 5/1997 |

| | | |
|---|---|---|
| EP | 0 618 527 B1 | 9/1999 |
| JP | 64-40004 | 2/1989 |
| JP | 1196620 | 8/1989 |
| JP | 2211421 | 8/1990 |
| JP | 5019233 | 1/1993 |
| JP | 5173707 | 7/1993 |
| JP | 9185457 | 12/1995 |
| JP | 8166849 | 6/1996 |
| JP | 91279 | 1/1997 |
| JP | 9231002 | 9/1997 |
| JP | 9274537 | 10/1997 |
| JP | 10027068 | 1/1998 |
| JP | 10-40004 | 2/1998 |
| JP | 10133817 | 5/1998 |
| JP | 10133819 | 5/1998 |
| JP | 10186136 | 7/1998 |
| JP | 10198515 | 7/1998 |
| JP | 11110110 | 4/1999 |
| JP | 11242562 | 9/1999 |
| JP | 200002041 | 1/2000 |
| WO | 99/21160 | 4/1999 |

OTHER PUBLICATIONS

Kim et al., "Fingerprint Scanner Using a-Si: H TFT-array," SID '00 Digest, May 14, 2000.

International Search Report for PCT/US03/03277, Nov. 11, 2003.

* cited by examiner

PhotoTFT
ReadoutTFT
Capacitor CST2

LIGHT SENSITIVE DISPLAY

This application claims the benefit of U.S. Patent Application Ser. No. 60/359,263 filed Feb. 20, 2002

BACKGROUND OF THE INVENTION

The present invention relates to touch sensitive displays.

Touch sensitive screens ("touch screens") are devices that typically mount over a display such as a cathode ray tube. With a touch screen, a user can select from options displayed on the display's viewing surface by touching the surface adjacent to the desired option, or, in some designs, touching the option directly. Common techniques employed in these devices for detecting the location of a touch include mechanical buttons, crossed beams of infrared light, acoustic surface waves, capacitance sensing, and resistive membranes.

For example, Kasday, U.S. Pat. No. 4,484,179 discloses an optically-based touch screen comprising a flexible clear membrane supported above a glass screen whose edges are fitted with photodiodes. When the membrane is flexed into contact with the screen by a touch, light which previously would have passed through the membrane and glass screen is trapped between the screen surfaces by total internal reflection. This trapped light travels to the edge of the glass screen where it is detected by the photodiodes which produce a corresponding output signal. The touch position is determined by coordinating the position of the CRT raster beam with the timing of the output signals from the several photodiodes. The optically-based touch screen increases the expense of the display, and increases the complexity of the display.

Denlinger, U.S. Pat. No. 4,782,328 on the other hand, relies on reflection of ambient light from the actual touch source, such as a finger or pointer, into a pair of photosensors mounted at corners of the touch screen. By measuring the intensity of the reflected light received by each photosensor, a computer calculates the location of the touch source with reference to the screen. The inclusion of the photosensors and associated computer increases the expense of the display, and increases the complexity of the display.

May, U.S. Pat. No. 5,105,186, discloses a liquid crystal touch screen that includes an upper glass sheet and a lower glass sheet separated by spacers. Sandwiched between the glass sheets is a thin layer of liquid crystal material. The inner surface of each piece of glass is coated with a transparent, conductive layer of metal oxide. Affixed to the outer surface of the upper glass sheet is an upper polarizer which comprises the display's viewing surface. Affixed to the outer surface of glass sheet is a lower polarizer. Forming the back surface of the liquid crystal display is a transflector adjacent to the lower polarizer. A transflector transmits some of the light striking its surface and reflects some light. Adjacent to transflector is a light detecting array of light dependent resistors whose resistance varies with the intensity of light detected. The resistance increases as the light intensity decreases, such as occurs when a shadow is cast on the viewing surface. The light detecting array detect a change in the light transmitted through the transflector caused by a touching of viewing surface. Similar to touch sensitive structures affixed to the front of the liquid crystal stack, the light sensitive material affixed to the rear of the liquid crystal stack similarly pose potential problems limiting contrast of the display, increasing the expense of the display, and increasing the complexity of the display.

Touch screens that have a transparent surface which mounts between the user and the display's viewing surface have several drawbacks. For example, the transparent surface, and other layers between the liquid crystal material and the transparent surface may result in multiple reflections which decreases the display's contrast and produces glare. Moreover, adding an additional touch panel to the display increases the manufacturing expense of the display and increases the complexity of the display. Also, the incorporation of the touch screen reduces the overall manufacturing yield of the display.

Accordingly, what is desired is a touch screen that does not significantly decrease the contrast ratio, does not significantly increase the glare, does not significantly increase the expense of the display, and does not significantly increase the complexity of the display.

DETAILED DESCRIPTION OF THE PREFERRED EMBODIMENT

Figure 1:
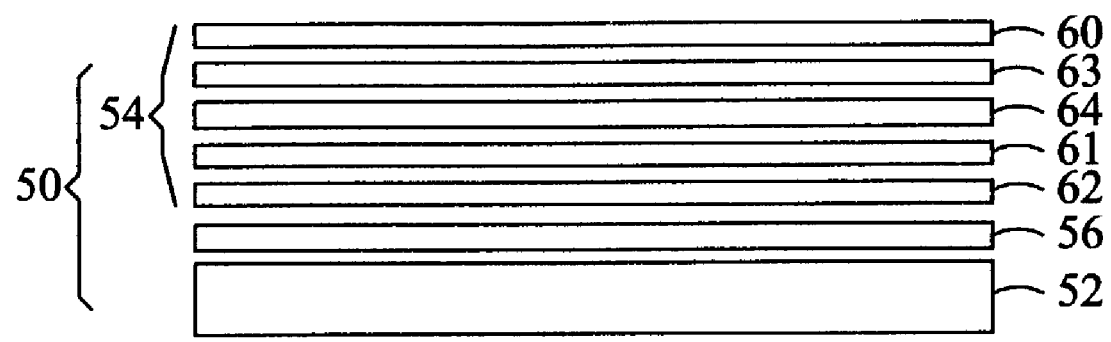
FIG. 1 is a cross sectional view of a traditional active matrix liquid crystal display.

Referring to FIG. 1, a liquid crystal display (LCD) 50 (indicated by a bracket) comprises generally, a backlight 52 and a light valve 54 (indicated by a bracket). Since liquid crystals do not emit light, most LCD panels are backlit with flourescent tubes or arrays of light-emitting diodes (LEDs) that are built into the sides or back of the panel. To disperse the light and obtain a more uniform intensity over the surface of the display, light from the backlight 52 typically passes through a diffuser 56 before impinging on the light valve 54.

The transmittance of light from the backlight 52 to the eye of a viewer 58, observing an image displayed on the front of the panel, is controlled by the light valve 54. The light valve 54 normally includes a pair of polarizers 60 and 62 separated by a layer of liquid crystals 64 contained in a cell gap between the polarizers. Light from the backlight 52 impinging on the first polarizer 62 comprises electromagnetic waves vibrating in a plurality of planes. Only that portion of the light vibrating in the plane of the optical axis of a polarizer passes through the polarizer. In an LCD light valve, the optical axes of the first 62 and second 60 polarizer are typically arranged at an angle so that light passing through the first polarizer would normally be blocked from passing through the second polarizer in the series. However, the orientation of the translucent crystals in the layer of liquid crystals 64 can be locally controlled to either "twist" the vibratory plane of the light into alignment with the optical axes of the polarizer, permitting light to pass through the light valve creating a bright picture element or pixel, or out of alignment with the optical axis of one of the polarizes, attenuating the light and creating a darker area of the screen or pixel.

The surfaces of the a first glass substrate 61 and a second glass substrate 63 form the walls of the cell gap are buffed to produce microscopic grooves to physically align the molecules of liquid crystal 64 immediately adjacent to the walls. Molecular forces cause adjacent liquid crystal molecules to attempt to align with their neighbors with the result that the orientation of the molecules in the column of molecules spanning the cell gap twist over the length of the column. Likewise, the plane of vibration of light transiting the column of molecules will be "twisted" from the optical axis of the first polarizer 62 to a plane determined by the orientation of the liquid crystals at the opposite wall of the cell gap. If the wall of the cell gap is buffed to align adjacent crystals with the optical axis of the second polarizer, light from the backlight 52 can pass through the series of polarizers 60 and 62 to produce a lighted area of the display when viewed from the front of the panel (a "normally white" LCD).

To darken a pixel and create an image, a voltage, typically controlled by a thin film transistor, is applied to an electrode in an array of transparent electrodes deposited on the walls of the cell gap. The liquid crystal molecules adjacent to the electrode are attracted by the field produced by the voltage and rotate to align with the field. As the molecules of liquid crystal are rotated by the electric field, the column of crystals is "untwisted," and the optical axes of the crystals adjacent to the cell wall are rotated progressively out of alignment with the optical axis of the corresponding polarizer progressively reducing the local transmittance of the light valve 54 and attenuating the luminance of the corresponding pixel. Conversely, the polarizers and buffing of the light valve can be arranged to produce a "normally black" LCD having pixels that are dark (light is blocked) when the electrodes are not energized and light when the electrodes are energized. Color LCD displays are created by varying the intensity of transmitted light for each of a plurality of primary color (typically, red, green, and blue) sub-pixels that make up a displayed pixel.

The aforementioned example was described with respect to a twisted nematic device. However, this description is only an example and other devices may likewise be used, including but not limited to, multi-domain vertical alignment, patterned vertical alignment, in-plane switching, and super-twisted nematic type LCDs. In addition other devices, such as for example, plasma displays, electroluminescent displays, liquid crystal on silicon displays, reflective liquid crystal devices may likewise be used. For such displays the light emitting portion of the display, or portion of the display that permits the display of selected portions of light may be considered to selectively cause the pixels to provide light.

For an active matrix LCD (AMLCD) the inner surface of the second glass substrate 63 is normally coated with a continuous electrode while the first glass substrate 61 is patterned into individual pixel electrodes. The continuous electrode may be constructed using a transparent electrode, such as indium tin oxide. The first glass substrate 61 may include thin film transistors (TFTs) which act as individual switches for each pixel electrode (or group of pixel electrodes) corresponding to a pixel (or group of pixels). The TFTs are addressed by a set of multiplexed electrodes running along the gaps between the pixel electrodes. Alternatively the pixel electrodes may be on a different layer from the TFTs. A pixel is addressed by applying voltage (or current) to a select line which switches the TFT on and allows charge from the data line to flow onto the rear pixel electrodes. The combination of voltages between the front electrode and the pixel electrodes sets up a voltage across the pixels and turns the respective pixels on. The thin-film transistors are typically constructed from amorphous silicon, while other types of switching devices may likewise be used, such as for example, metal-insulator-metal diode and poly-silicon thin-film transistors. The TFT array and pixel electrodes may alternatively be on the top of the liquid crystal material. Also the light sensitive elements may likewise be located on the top of the liquid crystal material, if desired.

Figure 2:
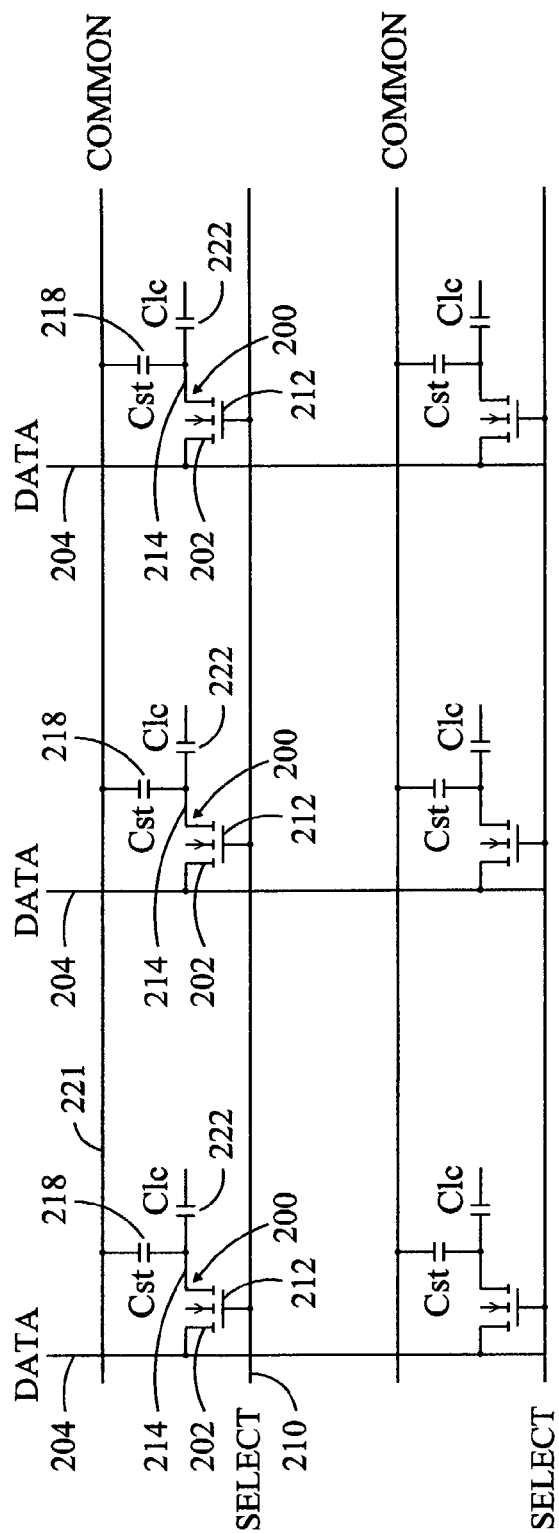
FIG. 2 is a schematic of the thin film transistor array.

Referring to FIG. 2, the active matrix layer may include a set of data lines and a set of select lines. Normally one data line is included for each column of pixels across the display and one select line is included for each row of pixels down the display, thereby creating an array of conductive lines. To load the data to the respective pixels indicating which pixels should be illuminated, normally in a row-by-row manner, a set of voltages are imposed on the respective data lines 204 which imposes a voltage on the sources 202 of latching transistors 200. The selection of a respective select line 210, interconnected to the gates 212 of the respective latching transistors 200, permits the voltage imposed on the sources 202 to be passed to the drain 214 of the latching transistors 200. The drains 214 of the latching transistors 200 are electrically connected to respective pixel electrodes and are capacitively coupled to a respective common line 221 through a respective Cst capacitor 218. In addition, a respective capacitance exists between the pixel electrodes enclosing the liquid crystal material, noted as capacitances Clc 222 (between the pixel electrodes and the common electrode on the color plate). The common line 221 provides a voltage reference. In other words, the voltage data (representative of the image to be displayed) is loaded into the data lines for a row of latching transistors 200 and imposing a voltage on the select line 210 latches that data into the holding capacitors and hence the pixel electrodes.

Figure 3:
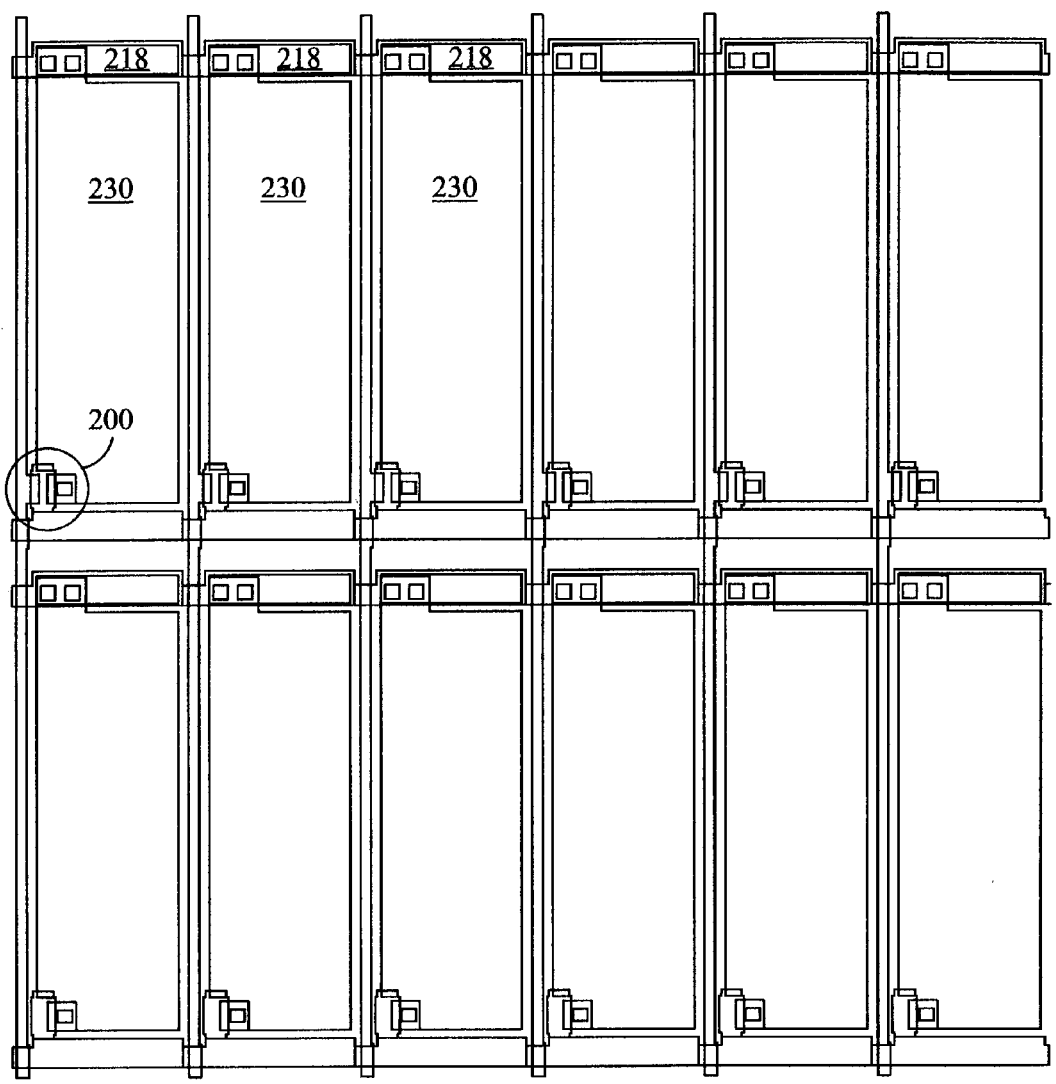
FIG. 3 is a layout of the thin film transistor array of FIG. 2.

Referring to FIG. 3, a schematic layout is shown of the active matrix layer. The pixel electrodes 230 are generally grouped into a "single" effective pixel so that a corresponding set of pixel electrodes 230 may be associated with respective color filters (e.g., red, green, blue). The latching transistors 200 interconnect the respective pixel electrodes 230 with the data lines and the select line. The pixel electrodes 230 may be interconnected to the common line 221 by the capacitors Cst 218.

Figures 4A, 4B, 4C, 4D, 4E, 4F, 4G, 4H:
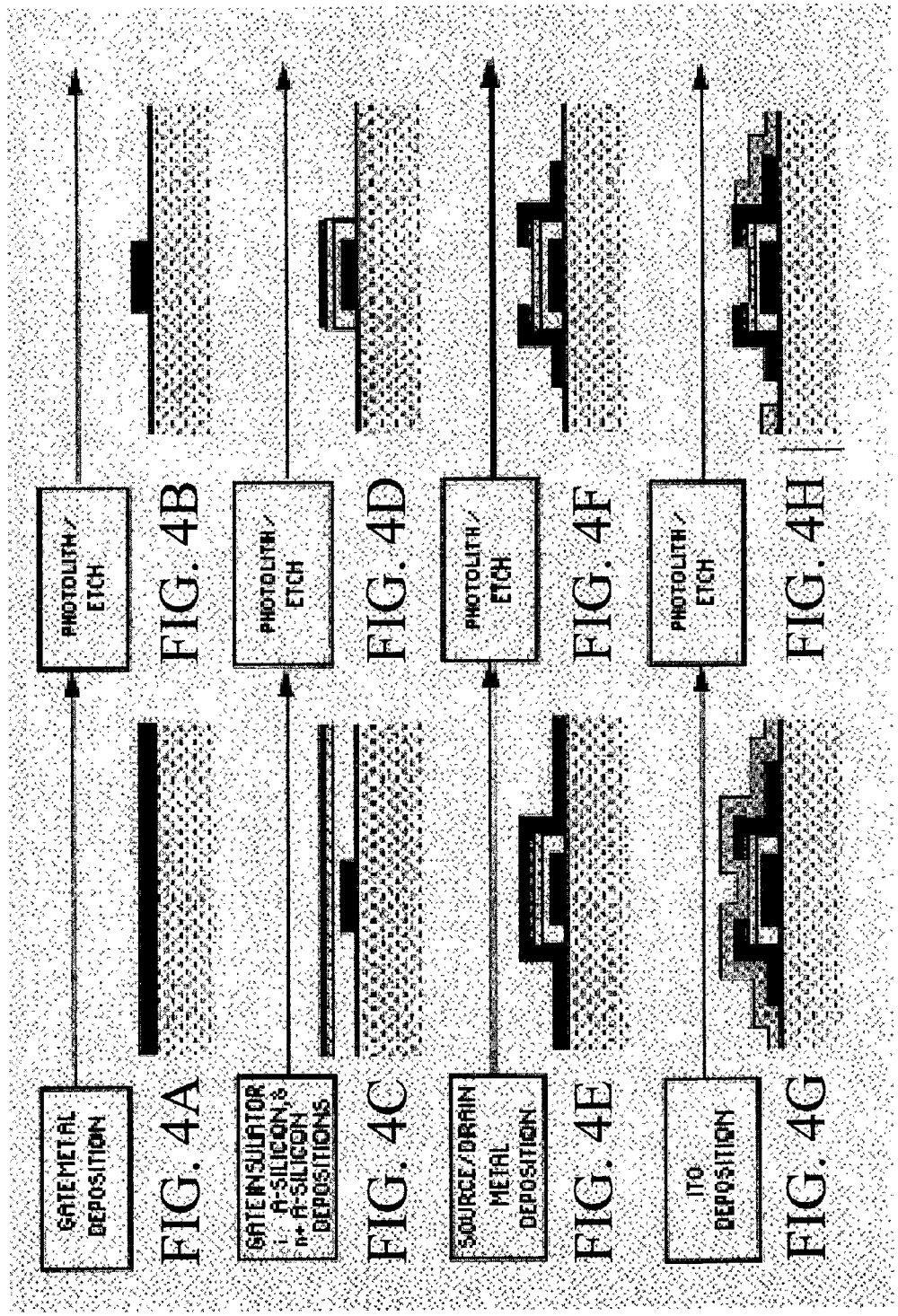
FIGS. 4A–4H is a set of steps suitable for constructing pixel electrodes and amorphous silicon thin-film transistors.

Referring to FIG. 4, the active matrix layer may be constructed using an amorphous silicon thin-film transistor fabrication process. The steps may include gate metal deposition (FIG. 4A), a photolithography/etch (FIG. 4B), a gate insulator and amorphous silicon deposition (FIG. 4C), a photolithography/etch (FIG. 4D), a source/drain metal deposition (FIG. 4E), a photolithography/etch (FIG. 4F), an ITO deposition (FIG. 4G), and a photolithography/etch (FIG. 4H). Other processes may likewise be used, as desired.

The present inventors considered different potential architectural touch panel schemes to incorporate additional optical layers between the polarizer on the front of the liquid crystal display and the front of the display. These additional layers include, for example, glass plates, wire grids, transparent electrodes, plastic plates, spacers, and other materials. In addition, the present inventors considered the additional layers with different optical characteristics, such as for example, birefringence, non-birefringence, narrow range of wavelengths, wide range of wavelengths, etc. After an extensive analysis of different potential configurations of the touch screen portion added to the display together with materials having different optical properties and further being applied to the different types of technologies (e.g., mechanical switches, crossed beams of infrared light, acoustic surface waves, capacitance sensing, and resistive membranes), the present inventors determined that an optimized touch screen is merely a tradeoff between different undesirable properties. Accordingly, the design of an optimized touch screen is an ultimately unsolvable task. In contrast to designing an improved touch screen, the present inventors came to the realization that modification of the structure of the active matrix liquid crystal device itself could provide an improved touch screen capability without all of the attendant drawbacks to the touch screen configuration located on the front of the display.

Figure 5:
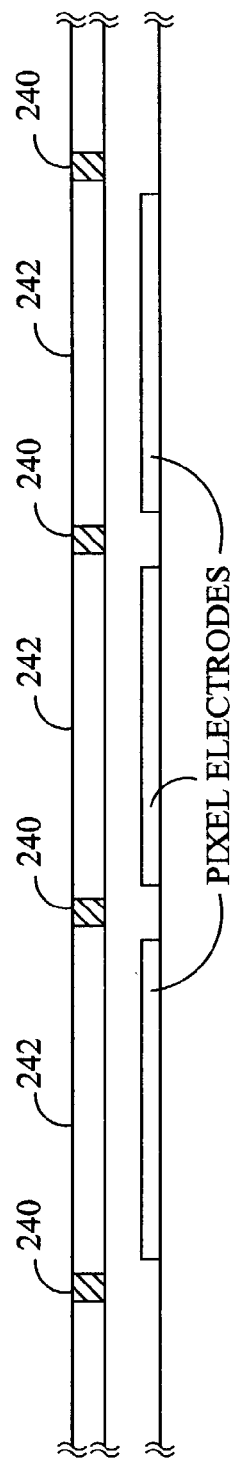
FIG. 5 illustrates pixel electrodes, color filters, and a black matrix.

Referring to FIG. 5, with particular attention to the latching transistors of the pixel electrodes, a black matrix 240 is overlying the latching transistors so that significant ambient light does not strike the transistors. Color filters 242 may be located above the pixel electrodes. Ambient light striking the latching transistors results in draining the charge imposed on the pixel electrodes through the transistor. The discharge of the charge imposed on the pixel electrodes results in a decrease in the operational characteristics of the display, frequently to the extent that the display is rendered effectively inoperative. With the realization that amorphous silicon transistors are sensitive to light incident thereon, the present inventors determined that such transistors within the active matrix layer may be used as a basis upon which to detect the existence of or non-existence of ambient light incident thereon (e.g., relative values thereto).

Figure 7:
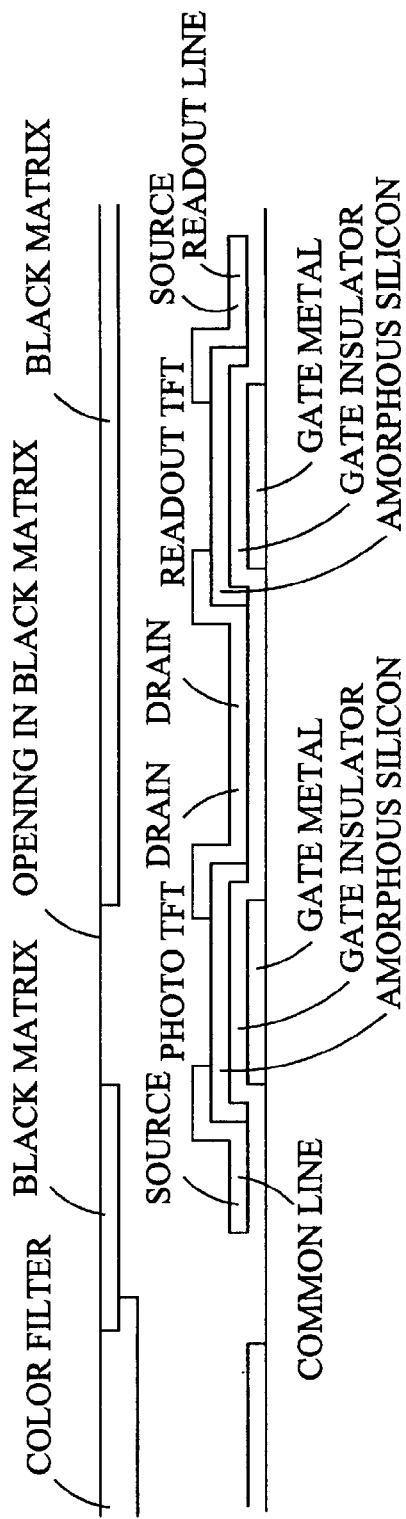
FIG. 7 illustrates a pixel electrode, photo TFT, readout TFT, and a black matrix.
Figure 6:
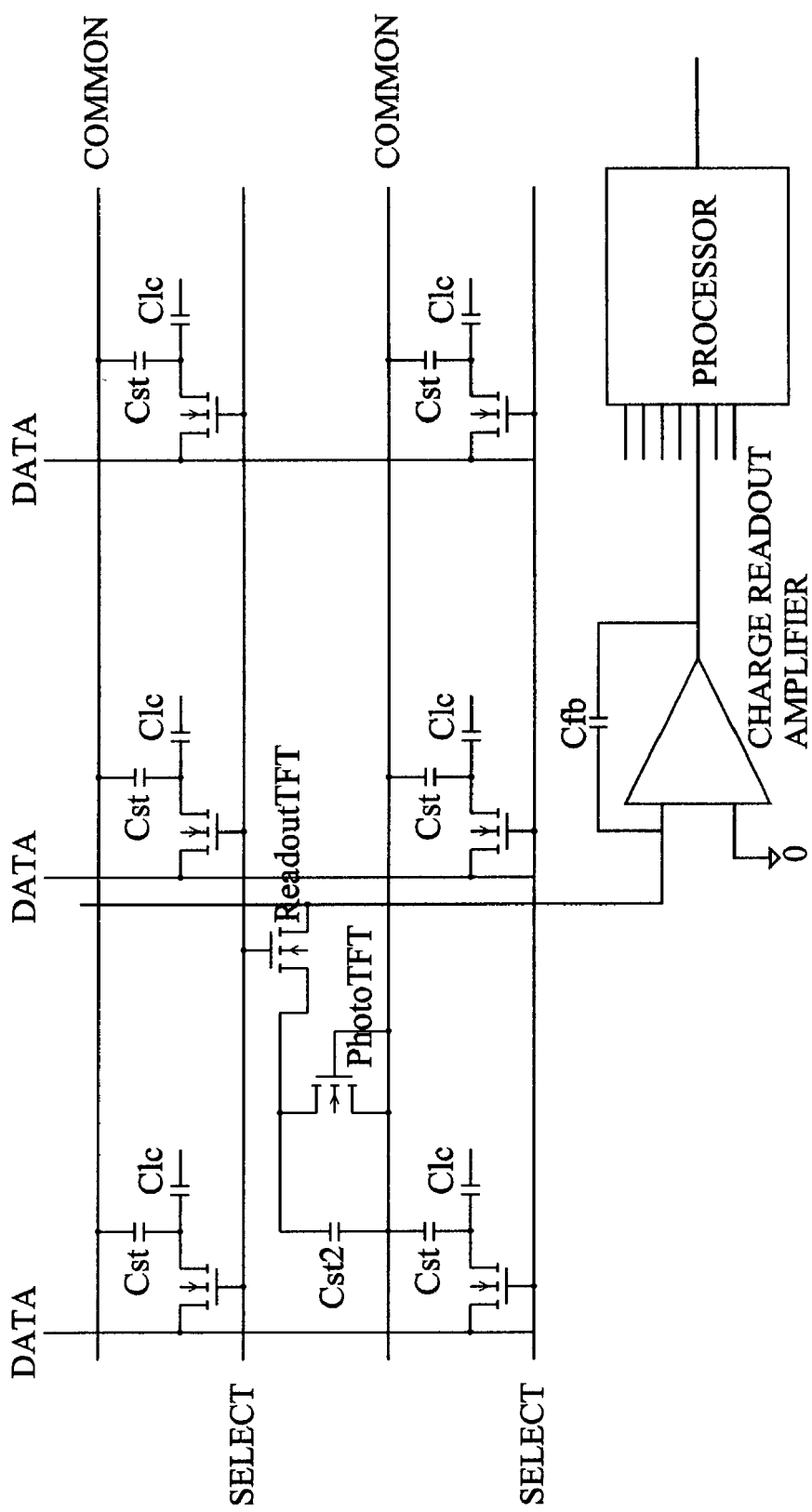
FIG. 6 illustrates a schematic of the active matrix elements, pixel electrode, photo TFT, readout TFT, and a black matrix.

Referring to FIG. 6, a modified active matrix layer may include a photo-sensitive structure or elements. The preferred photo-sensitive structure includes a photo-sensitive thin film transistor (photo TFT) interconnected to a readout thin film transistor (readout TFT). A capacitor Cst2 may interconnect the common line to the transistors. Referring to FIG. 7, a black matrix may be in an overlying relationship to the readout TFT. The black matrix is preferably an opaque material or otherwise the structure of the display selectively inhibiting the transmission of light to selective portions of the active matrix layer. Preferably the black matrix is completely overlying the amorphous silicon portion of the readout TFT, and at least partially overlying the amorphous silicon portion of the readout TFT. Preferably the black matrix is completely non-overlying the amorphous silicon portion of the photo TFT, and at least partially non-overlying the amorphous silicon portion of the photo TFT. Overlying does not necessarily denote direct contact between the layers, but is intended to denote in the general sense the stacked structure of materials. In some embodiments, the black matrix inhibits ambient light from impacting the amorphous silicon portion of the readout TFT to an extent greater than inhibiting ambient light from impacting the amorphous silicon portion of the photo TFT.

As an example, the common line may be set at a negative voltage potential, such as −10 volts. During the previous readout cycle, a voltage is imposed on the select line which causes the voltage on the readout line to be coupled to the drain of the photo TFT and the drain of the readout TFT, which results in a voltage potential across Cst2. The voltage coupled to the drain of the photo TFT and the drain of the readout TFT is approximately ground (e.g., zero volts) with the non-inverting input of the operational amplifier connected to ground. The voltage imposed on the select line is removed so that the readout TFT will turn "off".

Under normal operational conditions ambient light from the front of the display passes through the black matrix and strikes the amorphous silicon of the photo TFT. However, if a person touches the front of the display in a region over the opening in the black matrix or otherwise inhibits the passage of light through the front of the display in a region over the opening in the black matrix, then the photo TFT transistor will be in an "off" state. If the photo TFT is "off" then the voltage across the capacitor Cst2 will not significantly discharge through the photo TFT. Accordingly, the charge imposed across Cst2 will be substantially unchanged. In essence, the voltage imposed across Cst2 will remain substantially unchanged if the ambient light is inhibited from striking the photo TFT.

To determine the voltage across the capacitor Cst2, a voltage is imposed on the select line which causes the gate of the readout TFT to interconnect the imposed voltage on Cst2 to the readout line. If the voltage imposed on the readout line as a result of activating the readout TFT is substantially unchanged, then the output of the operational amplifier will be substantially unchanged (e.g., zero). In this manner, the system is able to determine whether the light to the device has been inhibited, in which case the system will determine that the screen has been touched at the corresponding portion of the display with the photo TFT.

During the readout cycle, the voltage imposed on the select line causes the voltage on the respective drain of the photo TFT and the drain of the readout TFT to be coupled to the respective readout line, which results in resetting the voltage potential across Cst2. The voltage coupled to the drain of the photo TFT and the drain of the readout TFT is approximately ground (e.g., zero volts) with the non-inverting input of the operational amplifier connected to ground. The voltage imposed on the select line is removed so that the readout TFT will turn "off". In this manner, the act of reading the voltage simultaneously acts to reset the voltage potential for the next cycle.

Under normal operational conditions ambient light from the front of the display passes through the black matrix and strikes the amorphous silicon of the photo TFT. If a person does not touch the front of the display in a region over the opening in the black matrix or otherwise inhibits the passage of light through the front of the display in a region over the opening in the black matrix, then the photo TFT transistor will be in an "on" state. If the photo TFT is "on" then the voltage across the capacitor Cst2 will significantly discharge through the photo TFT, which is coupled to the common line. In essence the voltage imposed across Cst2 will decrease toward the common voltage. Accordingly, the charge imposed across Cst2 will be substantially changed in the presence of ambient light. Moreover, there is a substantial difference in the voltage potential across the hold capacitor when the light is not inhibited verus when the light is inhibited.

Similarly, to determine the voltage across the capacitor Cst2, a voltage is imposed on the select line which causes the gate of the readout TFT to interconnect the imposed voltage to the readout line. If the voltage imposed on the readout line as a result of activating the readout TFT is substantially changed or otherwise results in an injection of current, then the output of the operational amplifier will be substantially non-zero. The output voltage of the operational amplifier is proportional or otherwise associated with the charge on the capacitor Cst2. In this manner, the system is able to determine whether the light to the device has been uninhibited, in which case the system will determine that the screen has not been touched at the corresponding portion of the display with the photo TFT.

Figure 8:
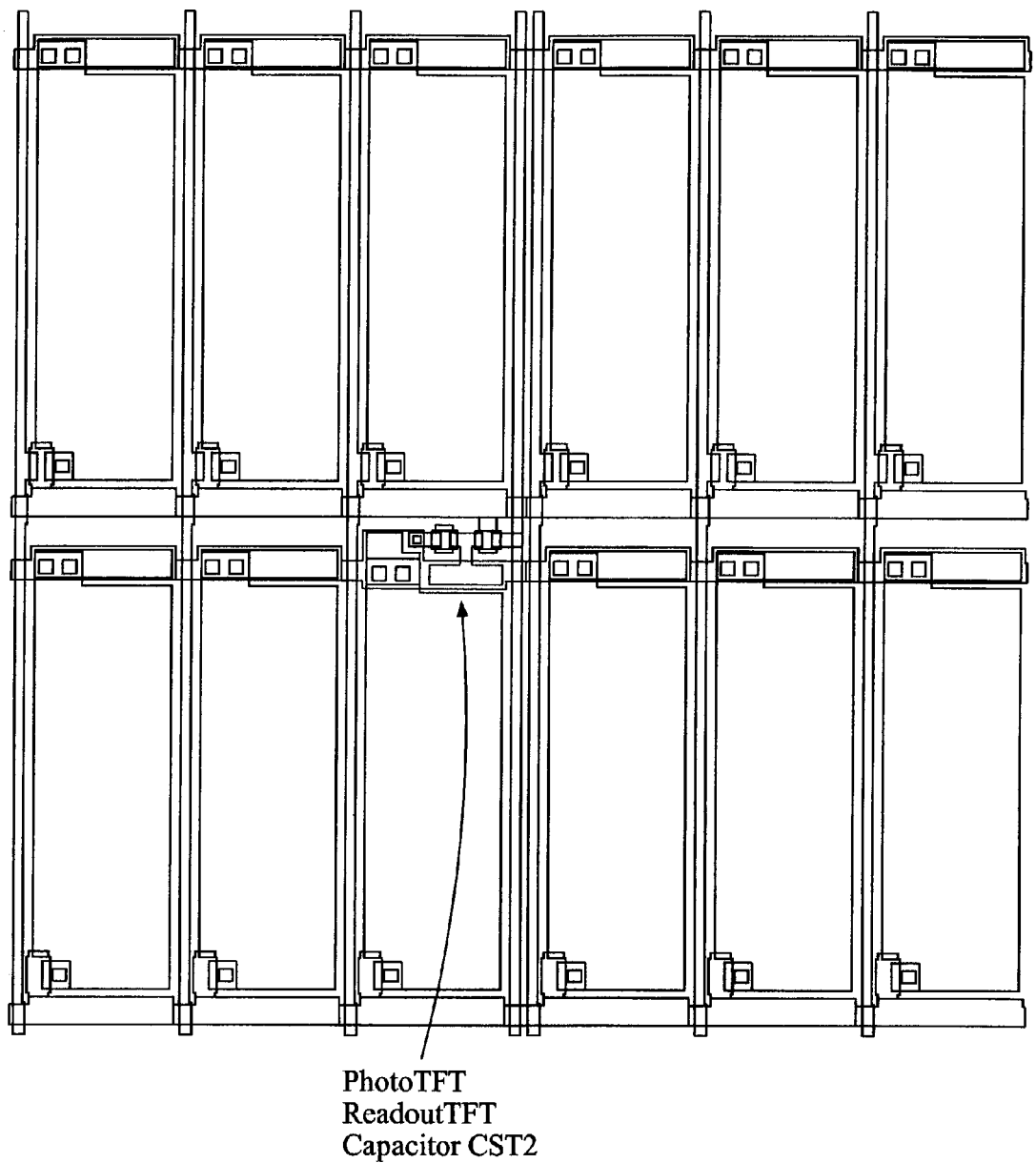
FIG. 8 is a layout of the thin film transistor array of FIGS. 6 and 7.

Referring to FIG. 8, a layout of the active matrix layer may include the photo TFT, the capacitor Cst2, the readout TFT in a region between the pixel electrodes. Light sensitive elements are preferably included at selected intervals within the active matrix layer. In this manner, the device may include touch panel sensitivity without the need for additional touch panel layers attached to the front of the display. In addition, the additional photo TFT, readout TFT, and capacitor may be fabricated together with the remainder of the active matrix layer, without the need for specialized processing. Moreover, the complexity of the fabrication process is only slightly increased so that the resulting manufacturing yield will remain substantially unchanged. It is to be understood that other light sensitive elements may likewise be used. In addition, it is to be understood that other light sensitive electrical architectures may likewise be used.

Figure 11:
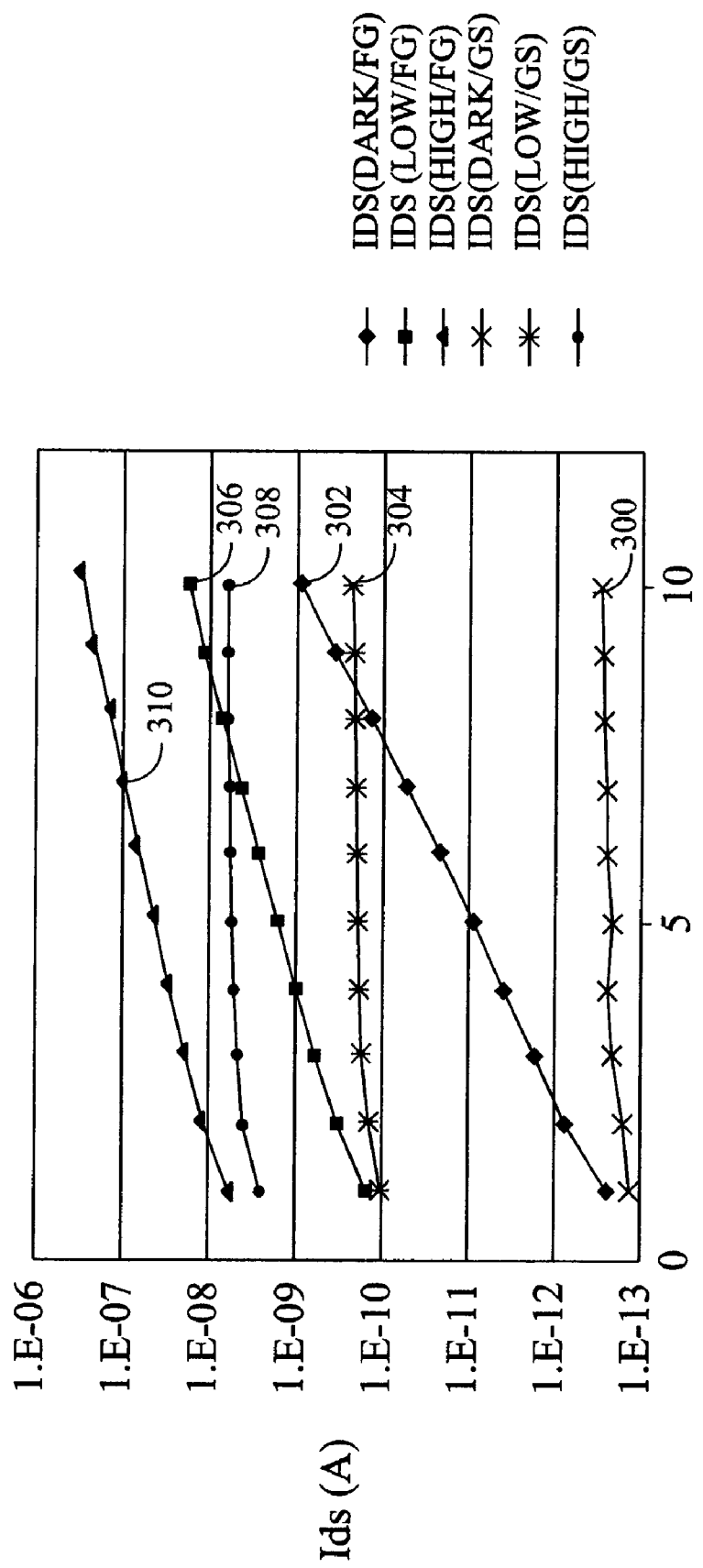
FIG. 11 is a graph of the photo-currents in an amorphous silicon TFT array.

Referring to FIG. 11, a graph of the photo-currents within amorphous silicon TFTs is illustrated. Line 300 illustrates a dark ambient environment with the gate connected to the source of the photo TFT. It will be noted that the leakage currents are low and relatively stable over a range of voltages. Line 302 illustrates a dark ambient environment with a floating gate of the photo TFT. It will be noted that the leakage currents are generally low and relatively unstable over a range of voltages (significant slope). Line 304 illustrates a low ambient environment with the gate connected to the source of the photo TFT. It will be noted that the leakage currents are three orders of magnitude higher than the corresponding dark ambient conditions and relatively stable over a range of voltages. Line 306 illustrates a low ambient environment with a floating gate of the photo TFT. It will be noted that the leakage currents are generally three orders of magnitude higher and relatively unstable over a range of voltages (significant slope). Line 308 illustrates a high ambient environment with the gate connected to the source of the photo TFT. It will be noted that the leakage currents are 4.5 orders of magnitude higher than the corresponding dark ambient conditions and relatively stable over a range of voltages. Line 310 illustrates a high ambient environment with a floating gate of the photo TFT. It will be noted that the leakage currents are generally 4.5 orders of magnitude higher and relatively unstable over a range of voltages (significant slope). With the significant difference between the dark state, the low ambient state, and the high ambient state, together with the substantially flat responses over a voltage range (source-drain voltage), the system may readily process the data in a confident manner, especially with the gate connected to the source.

Figure 9:
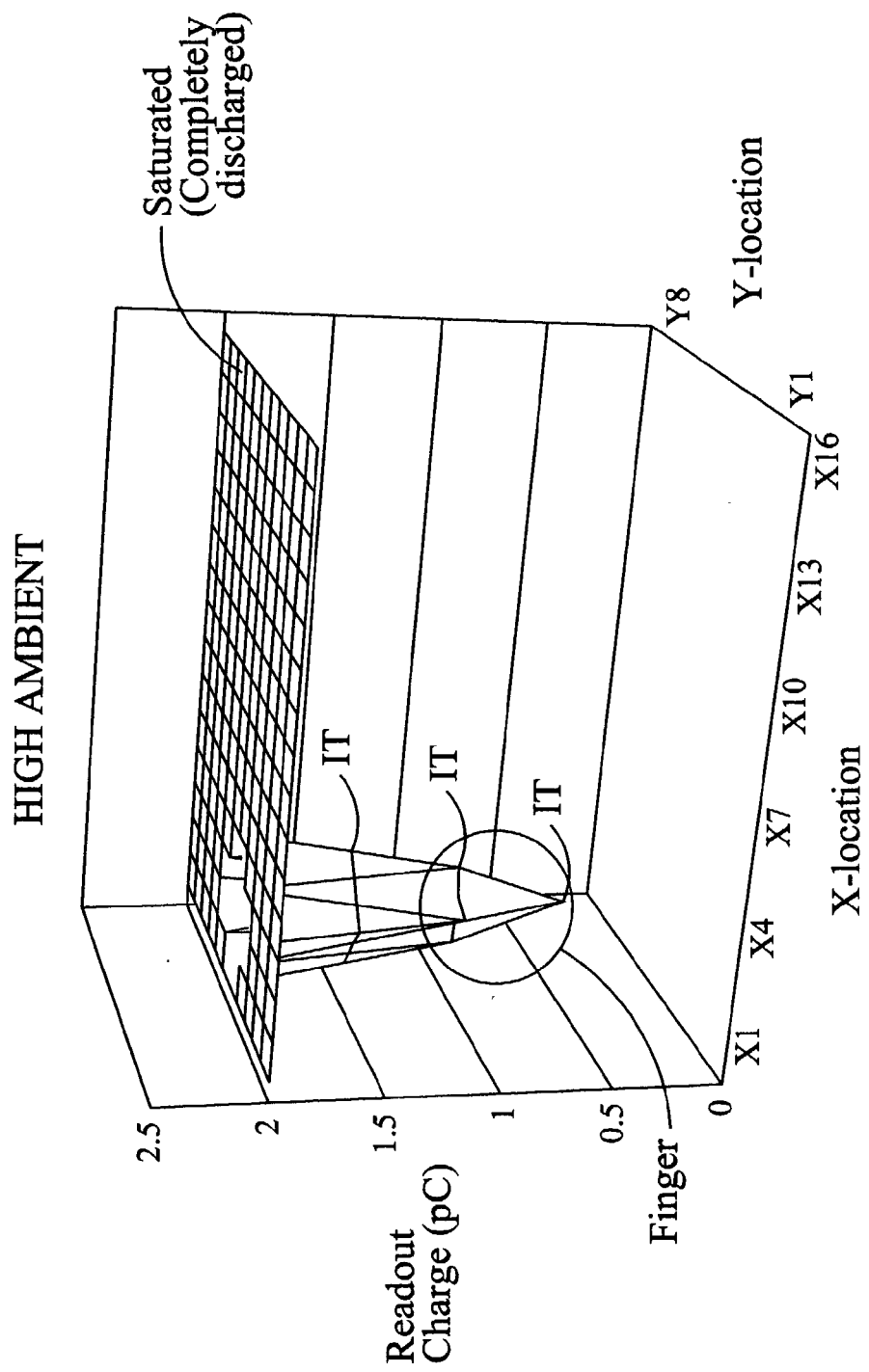
FIG. 9 is a graph of the capacitive charge on the light sensitive elements as a result of touching the display at high ambient lighting conditions.

Referring to FIG. 9, under high ambient lighting conditions the photo TFT will tend to completely discharge the Cst2 capacitor to the common voltage, perhaps with an offset voltage because of the photo TFT. In this manner, all of the photo TFTs across the display will tend to discharge to the same voltage level. Those regions with reduced ambient lighting conditions or otherwise where the user blocks ambient light from reaching the display, the Cst2 capacitor will not fully discharge, as illustrated by the downward spike in the graph. The downward spike in the graph provides location information related to the region of the display that has been touched.

Figure 10:
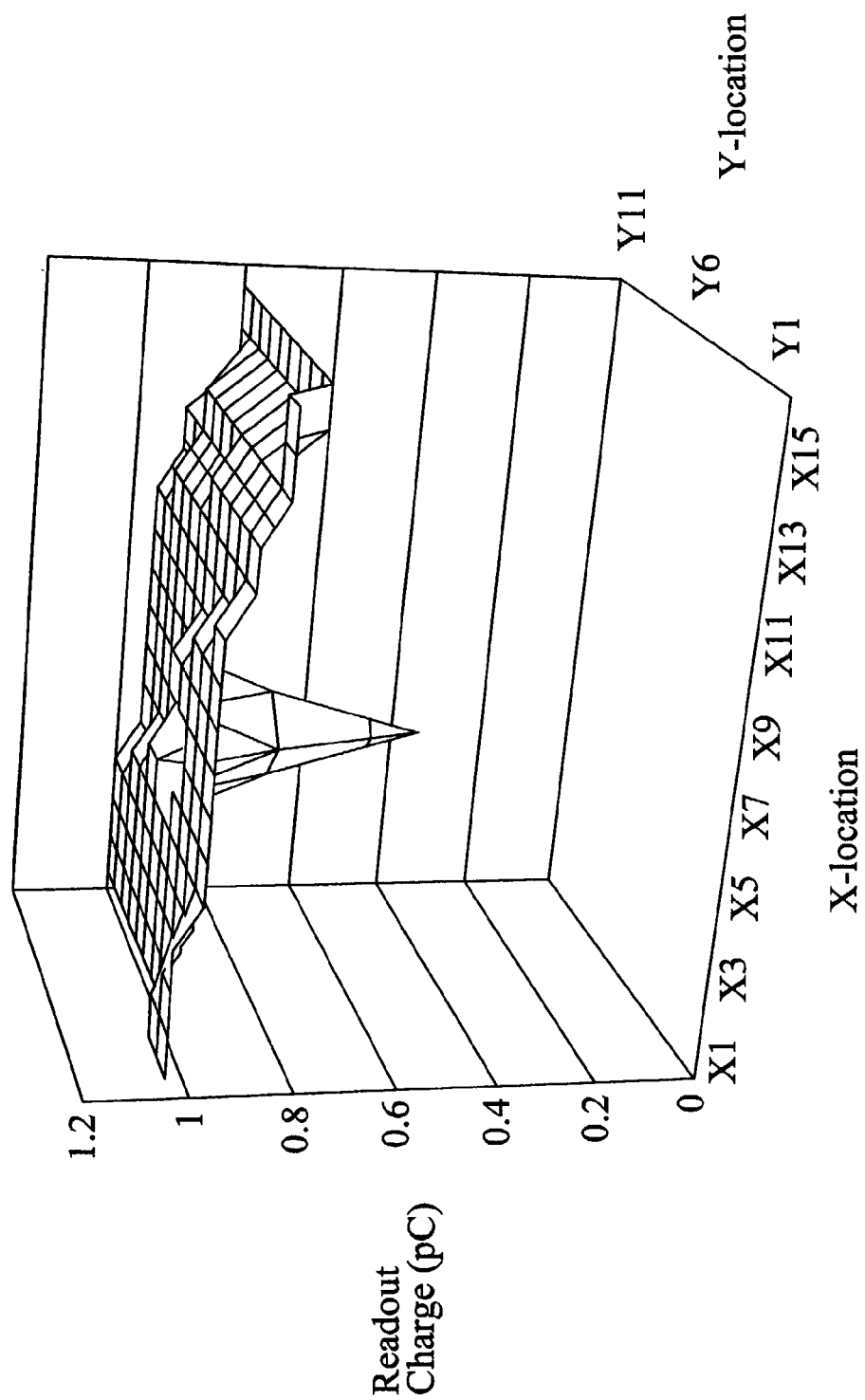
FIG. 10 is a graph of the capacitive charge on the light sensitive elements as a result of touching the display at low ambient lighting conditions.

Referring to FIG. 10, under lower ambient lighting conditions the photo TFT will tend to partially discharge the Cst2 capacitor to the common voltage. In this manner, all of the photo TFTs across the display will tend to discharge to some intermediate voltage levels. Those regions with further reduced ambient lighting conditions or otherwise where the user blocks ambient light from reaching the display, the Cst2 capacitor will discharge to a significantly less extent, as illustrated by the downward spike in the graph. The downward spike in the graph provides location information related to the region of the display that has been touched. As shown in FIGS. 9 and 10, the region or regions where the user inhibits light from reaching the display may be determined as localized minimums. In other embodiments, depending on the circuit topology, the location(s) where the user inhibits light from reaching the display may be determined as localized maximums or otherwise some measure from the additional components.

In the circuit topology illustrated, the value of the capacitor Cst2 may be selected such that it is suitable for high ambient lighting conditions or low ambient lighting conditions. For low ambient lighting conditions, a smaller capacitance may be selected so that the device is more sensitive to changes in light. For high ambient lighting conditions, a larger capacitance may be selected so that the device is less sensitive to changes in light. In addition, the dimensions of the photo transistor may be selected to change the photo-leakage current. Also, one set of light sensitive elements (e.g., the photo TFT and the capacitance) within the display may be optimized for low ambient lighting conditions while another set of light sensitive elements (e.g., the photo TFT and the capacitance) within the display may be optimized for high ambient lighting conditions. Typically, the data from light sensitive elements for low ambient conditions and the data from light sensitive elements for high ambient conditions are separately processed, and the suitable set of data is selected. In this manner, the same display device may be used for high and low ambient lighting conditions. In addition, multiple levels of sensitivity may be provided. It is to be understood that a single architecture may be provided with a wide range of sensitivity from low to high ambient lighting conditions.

Figure 12:
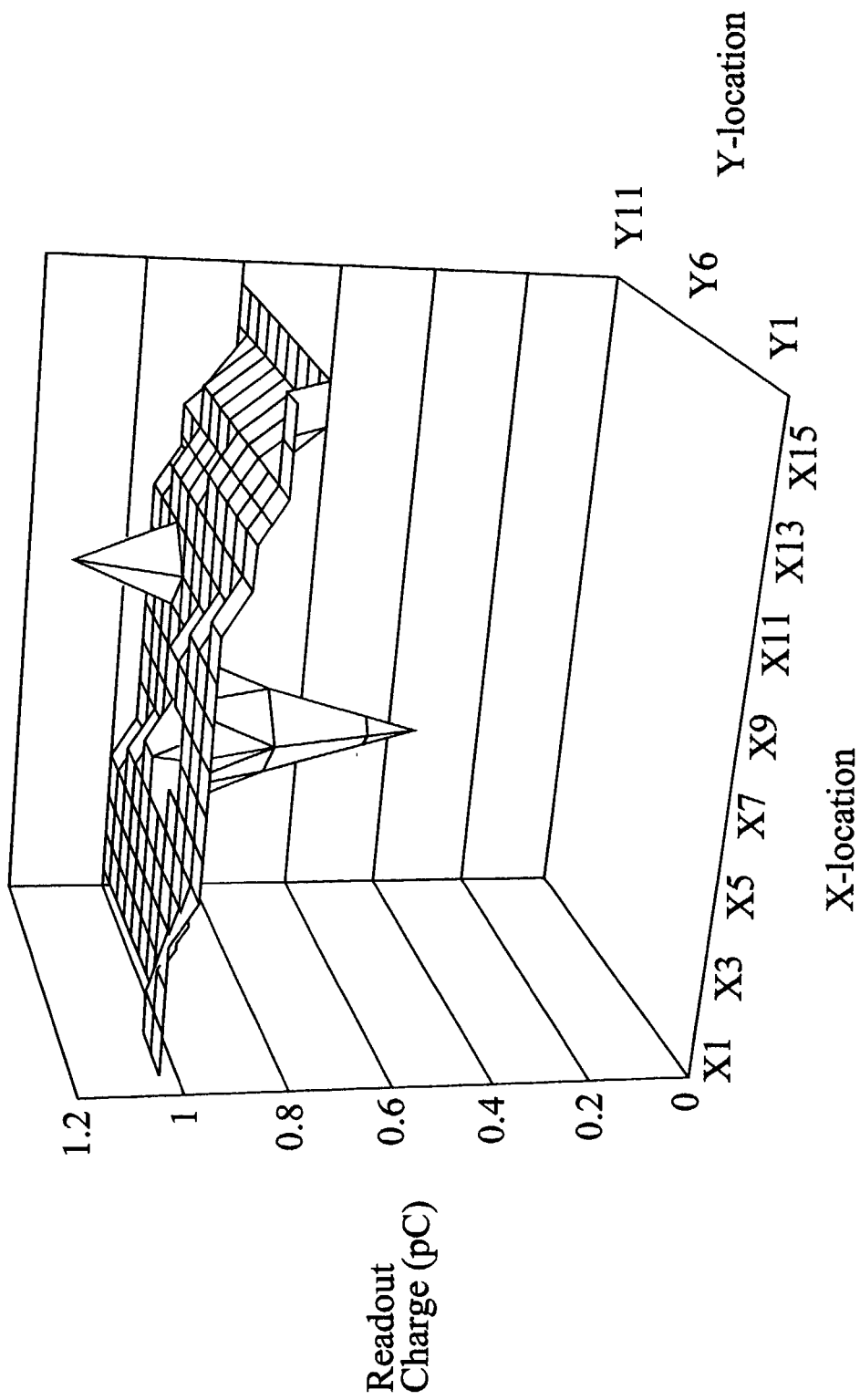
FIG. 12 is a graph of the capacitive charge on the light sensitive elements as a result of touching the display and providing light from a light wand.

Another structure that may be included is selecting the value of the capacitance so that under normal ambient lighting conditions the charge on the capacitor only partially discharges. With a structure where the capacitive charge only partially discharges, the present inventors determined that an optical pointing device, such as a light wand or laser pointer, may be used to point at the display to further discharge particular regions of the display. In this manner, the region of the display that the optical pointing device remains pointed at may be detected as local maximums (or otherwise). In addition, those regions of the display where light is inhibited will appear as local minimums (or otherwise). This provides the capability of detecting not only the absence of light (e.g., touching the panel) but likewise those regions of the display that have increased light incident thereon. Referring to FIG. 12, a graph illustrates local minimums (upward peaks) from added light and local maximums (downward peaks) from a lack of light. In addition, one set of light sensitive elements (e.g., the photo TFT and the capacitance) within the display may be optimized for ambient lighting conditions to detect the absence of light while another set of light sensitive elements (e.g., the photo TFT and the capacitance) within the display may be optimized for ambient lighting conditions to detect the additional light imposed thereon.

A switch associated with the display may be provided to select among a plurality of different sets of light sensitive elements. For example, one of the switches may select between low, medium, and high ambient lighting conditions. For example, another switch may select between a touch sensitive operation (absence of light) and a optical pointing device (addition of light). In addition, the optical pointing device may communicate to the display, such as through a wire or wireless connection, to automatically change to the optical sensing mode.

It is noted that the teachings herein are likewise applicable to transmissive active matrix liquid crystal devices, reflective active matrix liquid crystal devices, transflective active matrix liquid crystal devices, etc. In addition, the light sensitive elements may likewise be provided within a passive liquid crystal display. The sensing devices may be, for example, photo resistors and photo diodes.

Alternatively, light sensitive elements may be provided between the rear polarizing element and active matrix layer. In this arrangement, the light sensitive elements are preferably fabricated on the polarizer, or otherwise a film attached to the polarizer. In addition, the light sensitive elements may be provided on a thin glass plate between the polarizer and the liquid crystal material. In addition, the black matrix or otherwise light inhibiting material is preferably arranged so as to inhibit ambient light from striking the readout TFT while free from inhibiting light from striking the photo TFT. Moreover, preferably a light blocking material is provided between the photo TFT and/or the readout TFT and the backlight, such as gate metal, if provided, to inhibit the light from the backlight from reaching the photo TFT and/or the readout TFT.

Alternatively, light sensitive elements may be provided between the front polarizing element and the liquid crystal material. In this arrangement, the light sensitive elements are preferably fabricated on the polarizer, or otherwise a film attached to the polarizer. In addition, the light sensitive elements may be provided on a thin glass plate between the polarizer and the liquid crystal material. The light sensitive elements may likewise be fabricated within the front electrode layer by patterning the front electrode layer and including suitable fabrication techniques. In addition, a black matrix or otherwise light inhibiting material is preferably arranged so as to inhibit ambient light from striking the readout TFT while free from inhibiting light from striking the photo TFT. Moreover, preferably a light blocking material is provided between the photo TFT and/or the readout TFT and the backlight, if provided, to inhibit the light from the backlight from reaching the photo TFT and/or the readout TFT.

Alternatively, light sensitive elements may be provided between the front of the display and the rear of the display, normally fabricated on one of the layers therein or fabricated on a separate layer provided within the stack of layers within the display. In the case of a liquid crystal device with a backlight the light sensitive elements are preferably provided between the front of the display and the backlight material. The position of the light sensitive elements are preferably between (or at least partially) the pixel electrodes, when viewed from a plan view of the display. This may be particularly useful for reflective displays where the pixel electrodes are opaque. In this arrangement, the light sensitive elements are preferably fabricated on one or more of the layers, or otherwise a plate attached to one or more of the layers. In addition, a black matrix or otherwise light inhibiting material is preferably arranged so as to inhibit ambient light from striking the readout TFT while free from inhibiting light from striking the photo TFT. Moreover, preferably a light blocking material is provided between the photo TFT and/or the readout TFT and the backlight, if provided, to inhibit the light from the backlight from reaching the photo TFT and/or the readout TFT.

In many applications it is desirable to modify the intensity of the backlight for different lighting conditions. For example, in dark ambient lighting conditions it may be beneficial to have a dim backlight. In contrast, in bright ambient lighting conditions it may be beneficial to have a bright backlight. The integrated light sensitive elements within the display stack may be used as a measure of the ambient lighting conditions to control the intensity of the backlight without the need for an additional external photosensor. One light sensitive element may be used, or a plurality of light sensitive element may be used together with additional processing, such as averaging.

What is claimed is:

1. A liquid crystal device comprising:
   (a) a front electrode layer;
   (b) a rear electrode layer;
   (c) a liquid crystal material located between said front electrode layer and said rear electrode layer;
   (d) changing an electrical potential between said rear electrode layer and said front electrode layer to selectively modify portions of said liquid crystal material to change the polarization of the light incident thereon;
   (e) said rear electrode layer comprising a plurality of select electrodes and a plurality of data electrodes such that one of said select electrodes in combination with a plurality of said data electrodes selectively change said electrical potential for a plurality of different portions of said liquid crystal material;
   (f) a first transistor which is a photo transistor comprising:
      (i) a first terminal;
      (ii) a second terminal;
      (iii) a third terminal;
   (g) a second transistor comprising:
      (i) a first terminal;
      (ii) a second terminal;
      (iii) a third terminal;
   (h) said first terminal of said first transistor electrically interconnected to a conductive electrode free from additional electrical elements therebetween;
   (i) said second terminal of said first transistor electrically interconnected to said conductive electrode free from additional electrical elements therebetween and said second terminal of said first transistor is maintained at the same potential as said conductive electrode;
   (j) said first terminal of said first transistor and said second terminal of said first transistor electrically interconnected to one another free from additional electrical elements therebetween and said first terminal of said first transistor and said second terminal of said first transistor are maintained at the same potential;
   (k) said second terminal of said first transistor is a gate of said first transistor;
   (l) said third terminal of said first transistor electrically interconnected to said first terminal of said second transistor free from additional electrical elements therebetween and maintained at the same potential;

(m) said second terminal of said second transistor electrically connected to one of said select electrodes;

(n) said second terminal of said second transistor is a gate of said second transistor;

(o) said third terminal of said second transistor is electrically interconnected to a readout system;

(p) said second transistor is substantially inhibited from receiving ambient light thereon, said first transistor is not substantially inhibited from receiving ambient light thereon;

(q) said first transistor and said second transistor being together with said rear electrode layer; and (r) said readout system determines a region of said device that experiences a change in the light level greater than and less than the relative background ambient light.

2. The device of claim 1 wherein at least one of said first transistor and said second transistor is a thin-film transistor.

3. The device of claim 2 wherein said first transistor and said second transistor are thin-film transistors.

4. The device of claim 3 wherein the semiconductor material of said first transistor and said second transistor is amorphous silicon.

5. The device of claim 4 wherein said third terminal of said first transistor is capacitively coupled to said conductive electrode.

6. The device of claim 5 wherein said conductive electrode has a voltage potential less than said third terminal of said second transistor.

7. The device of claim 1 wherein said device is an active matrix liquid crystal device.

8. The device of claim 1 wherein said second transistor provides an output in response to a change in the amount of ambient light reaching said first transistor.

9. The device of claim 1 wherein said conductive electrode is said one of said select electrodes.

10. A liquid crystal device comprising:
(a) a front electrode layer;
(b) a rear electrode layer;
(c) a liquid crystal material located between said front electrode layer and said rear electrode layer;
(d) changing an electrical potential between said rear electrode layer and said front electrode layer to selectively modify portions of said liquid crystal material to change the polarization of the light incident thereon;
(e) said rear electrode layer comprising a plurality of select electrodes and a plurality of data electrodes such that one of said select electrodes in combination with a plurality of said data electrodes selectively change said electrical potential for a plurality of different portions of said liquid crystal material;
(f) a first transistor which is a photo transistor comprising:
  (i) a first terminal;
  (ii) a second terminal;
  (iii) a third terminal;

(g) a second transistor comprising:
  (ii) a second terminal;
  (i) a first terminal;
  (iii) a third terminal;

(h) said first terminal of said first transistor electrically interconnected to said second terminal of said first transistor free from additional electrical elements therebetween and said first terminal of said first transistor and said second terminal of said first transistor are maintained at the same potential;

(i) said first terminal of said first transistor and said second terminal of said first transistor electrically interconnected to one of a conductive electrode free from additional electrical elements therebetween and maintained at the same potential and to said first terminal of said second transistor free from additional electrical elements therebetween and maintained at the same potential;

(i) said second terminal of said first transistor is a gate of said first transistor;

(k) said third terminal of said first transistor electrically interconnected to the other of said conductive electrode free from additional electrical elements therebetween and said first terminal of said second transistor free from additional electrical elements therebetween;

(l) said second terminal of said second transistor electrically connected to one of said select electrodes;

(m) said second terminal of said second transistor is a gate of said second transistor;

(n) said third terminal of said second transistor is electrically interconnected to a readout system;

(o) said second transistor is substantially inhibited from receiving ambient light thereon, said first transistor is not substantially inhibited from receiving ambient light thereon;

(p) said first transistor and said second transistor being together with said rear electrode layer; and (r) said readout system determines a region of said device that experiences a change in the light level greater than and less than the background ambient light.

11. The device of claim 10 wherein at least one of said first transistor and said second transistor is a thin-film transistor.

12. The device of claim 11 wherein said first transistor and said second transistor are thin-film transistors.

13. The device of claim 12 wherein the semiconductor material of said first transistor and said second transistor is amorphous silicon.

14. The device of claim 13 wherein said third terminal of said first transistor is capacitively coupled to said conductive electrode.

15. The device of claim 10 wherein said device is an active matrix liquid crystal device.

16. The device of claim 10 wherein said second transistor provides an output in response to a decrease in the amount of ambient light reaching said first transistor.

17. The device of claim 10 wherein said conductive electrode is said one of said select electrodes.

* * * * *

UNITED STATES PATENT AND TRADEMARK OFFICE
CERTIFICATE OF CORRECTION

PATENT NO. : 6,995,743 B2  Page 1 of 1
APPLICATION NO. : 10/307106
DATED : February 7, 2006
INVENTOR(S) : Willem den Boer et al.

It is certified that error appears in the above-identified patent and that said Letters Patent is hereby corrected as shown below:

Col. 3, lines 13 - 14
Change "the polarizes, attenuating" to --the polarizers, attenuating--.

Col. 3, line 16
Change "of the a" to --of a--.

Col. 3, line 17
Change "gap are" to --gap and are--.

Col. 6, line 64
Change "inhibited verus when" to --inhibited versus when--.

Col. 12, lines 2-3, claim 10
Change "(ii) a second terminal; (i) a first terminal; (iii) a third terminal;" to --(i) a first terminal; (ii) a second terminal; (iii) a third terminal;--.

Col. 12, line 18, claim 10
Change "(i) said second terminal" to --(j) said second terminal--.

Col. 12, line 37, claim 10
Change "(r) said readout system" to --(q) said readout system--.

Signed and Sealed this

Sixteenth Day of September, 2008

JON W. DUDAS
*Director of the United States Patent and Trademark Office*